T. H. & J. E. HOLGAN.
REVERSING MECHANISM.
APPLICATION FILED OCT. 12, 1907.
901,172.
Patented Oct. 13, 1908.
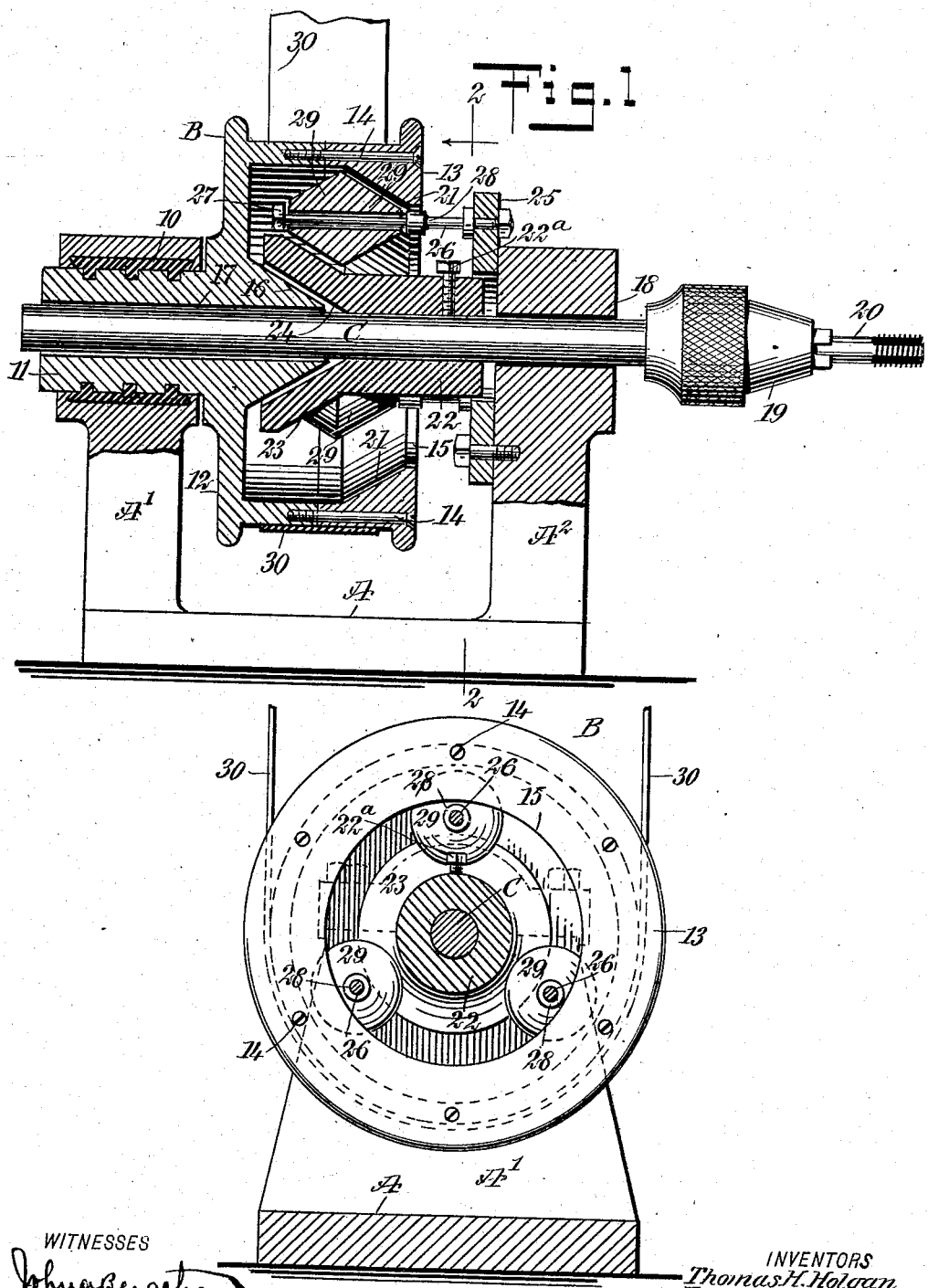

UNITED STATES PATENT OFFICE.

THOMAS H. HOLGAN AND JAMES EVERETT HOLGAN, OF NEW YORK, N. Y.

REVERSING MECHANISM.

No. 901,172.      Specification of Letters Patent.      Patented Oct. 13, 1908.

Application filed October 12, 1907.  Serial No. 397,098.

*To all whom it may concern:*

Be it known that we, THOMAS H. HOLGAN and JAMES E. HOLGAN, both citizens of the United States, and residents of the city of New York, borough of Brooklyn, in the county of Kings and State of New York, have invented a new and useful Improvement in Reversing Mechanisms, of which the following is a full, clear, and exact description.

The invention relates to a means for transmitting rotary motion in either direction.

The purpose of the invention is to provide a simple, durable, and economic construction especially applicable to shafts carrying drill chucks, and to so construct the device that as a drill or tap is brought into engagement with the work, the drill shaft will be automatically engaged with the driving pulley in a manner to feed the drill or tap into the material, and whereby as the work is withdrawn, the said shaft will be brought into such relation to the said driving pulley as to reverse the direction of rotation and withdraw the drill or tap from the work.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in both the figures.

Figure 1 is a longitudinal, vertical section through the reversing mechanism; and Fig. 2 is a vertical section taken practically on the line 2—2 of Fig. 1.

A represents the base of the machine, and A′ and A² two standards. The standard A′ is provided with a suitable bearing 10, for the hub 11 of a hollow driving pulley B. This driving pulley B is constructed in two sections, a rear section 12 that is integral with the hub 11, and a forward section 13, and the two sections are connected by bolts 14, or their equivalents, and the forward section 13 of the pulley is provided with a circular opening 15, as is best shown in Fig. 2.

A cone projection 16 is carried by the pulley B projecting from the hub 11, as is shown in Fig. 1, and the said hub 11 and its projection 16 are provided with a continuous bore 17, and in this bore 17 a shaft C is mounted to slide and to revolve. The forward portion of the shaft C is mounted to turn in a suitable bearing 18 in the standard A², and at the outer end of the shaft C, a chuck 19 is located, adapted to carry any approved form of boring tool 20. The forward section 13 of the hollow pulley B is provided with an interior conical face 21 at its periphery, as is illustrated in Fig. 1, and the conical surfaces 16 and 21 face each other, a suitable space intervening them.

A collar or a sleeve 22 is secured upon the shaft C in any suitable or approved manner, as shown by a set screw 22ª, and the rear end of this collar or sleeve 22 is made flaring and is cone shaped interiorly and exteriorly, the outer cone surface or face being designated as 23 and the inner cone surface or face as 24, and the said inner cone surface or face is adapted for frictional engagement with the conical surface of the projection 16 from the hub 11. A ring support 25, is secured to the inner face of the standard A², and secured in any suitable or approved manner to the ring support 25 is a series of spindles 26, and these spindles extend within the driving pulley B between the cone faces thereof, and each spindle 26 is provided with a head 27 at its rear or free end, and with a collar 28 that is located at the opening 15 in the forward section 13 of the said driving pulley B.

A double cone-faced roller 29, is mounted to turn upon each spindle 26 between the collar and the head of the spindle, as is clearly shown in Fig. 1, and the said double cone-faced rollers have limited sliding movement upon their spindles, which spindles constitute mounts for the said rollers. One cone face of each roller is opposite the peripheral cone face 21 of the pulley and is adapted for engagement therewith, and the other cone face of the said roller is adapted for engagement with the exterior cone surface 23 of the flaring portion of the sleeve 22. We desire it to be understood that instead of using a sleeve 22, the double cone projection from the shaft may be integral therewith or simply attached thereto.

A suitable driving belt 30 is passed around the pulley B. The pulley B may be constantly revolved, and when the tool 20 is brought against the work, the shaft C is forced rearward and the inner cone face 24 of the sleeve 22 will engage with the cone face of the projection 16 of the hub of the pulley, and the shaft will be turned in direction to force the tool into the work. When the work has been drilled as far as desired and the tool is to be removed, the direction of rotation is reversed by simply drawing the shaft C outward, at which time the cone face 24 of the shaft projection is disengaged from the cone face of the projection 16, and the exterior cone surface or face 23 of the said shaft projection is brought in engagement with the rear coned portions of the rollers 29, and said rollers are then slid forward, bringing their forward cone faces in engagement with the peripheral cone face 21 of the pulley B.

This device is exceedingly simple and is very easy of operation, it being only necessary to shift the shaft C backward and forward.

Having thus described our invention, we claim as new and desire to secure by Letters Patent,—

1. In a reversing mechanism, a hollow driving pulley having an interior conical projection at its hub, and an opposing interior peripheral conical face, a double cone-faced roller, mounted to revolve within the pulley, one of whose cone faces is adapted to engage with the peripheral cone face of the pulley, a shaft slidable in the pulley, an annular projection fixedly secured to the shaft, said projection being interiorly and exteriorly conical, which projection extends between the hub cone of the pulley and opposing cone of the roller, the said shaft projection being adapted for engagement either with the said roller or the said hub cone according to the direction in which the shaft is moved.

2. In a reversing mechanism, a driving pulley having opposing inner cone faces, one at the hub and the other at the periphery, a shaft slidable in said pulley, a double cone-faced roller slidably and rotatably mounted in said pulley, being independent thereof and adapted for engagement with the peripheral cone face of the pulley, and an annular projection fixedly secured to the shaft, said projection being interiorly and exteriorly conical, interposed between the hub cone of the pulley and a cone face of said roller, and adapted for engagement with either of said faces according to the direction in which the shaft is moved.

3. In a reversing mechanism, a driving pulley having a cone projection at its hub and an interior conical face at its periphery, a double faced cone mounted on a fixed support and projecting into the pulley, a shaft slidable in the pulley, and a collar fixed on the shaft and having a flaring end, cone-shaped interiorly and exteriorly, the inner cone face of the collar being adapted for engagement with the cone projection of the hub and the exterior face with the double cone.

4. In a reversing mechanism, a support, a driving pulley mounted at one end in the support and having a cone projection on its hub and an interior conical face on its periphery, spindles mounted at one end in the support and projecting into the pulley, double faced cones on the spindles and adapted to engage with the peripheral conical face of the pulley, a shaft slidably mounted in the pulley and support, and a collar fixedly secured to the shaft and having a flaring end, cone-shaped exteriorly and interiorly, the inner cone face of the collar being adapted to engage with the cone hub projection and the outer cone face with the double cone.

In testimony whereof we have signed our names to this specification in the presence of two subscribing witnesses.

THOMAS H. HOLGAN.
JAMES EVERETT HOLGAN.

Witnesses:
J. FRED. ACKER,
JOHN P. DAVIS.